United States Patent [19]
Lo et al.

[11] Patent Number: 6,151,706
[45] Date of Patent: Nov. 21, 2000

[54] METHOD, SYSTEM, AND COMPUTER PROGRAM PRODUCT FOR EXTENDING SPARSE PARTIAL REDUNDANCY ELIMINATION TO SUPPORT SPECULATIVE CODE MOTION WITHIN AN OPTIMIZING COMPILER

[75] Inventors: Raymond Lo, Sunnyvale; Frederick Chow, Fremont, both of Calif.

[73] Assignee: Silicon Graphics, Inc., Mountain View, Calif.

[21] Appl. No.: 09/097,715

[22] Filed: Jun. 16, 1998

[51] Int. Cl.$^7$ ..................................................... G06F 9/45
[52] U.S. Cl. .............................................................. 717/9
[58] Field of Search ................................. 395/709; 717/9

[56] References Cited

U.S. PATENT DOCUMENTS

| | | | |
|---|---|---|---|
| 5,327,561 | 7/1994 | Choi et al. | 395/709 |
| 5,659,754 | 8/1997 | Grove et al. | 395/709 |
| 5,692,169 | 11/1997 | Kathail et al. | 395/709 |
| 5,768,596 | 6/1998 | Chow et al. | 395/709 |
| 5,778,219 | 7/1998 | Amerson et al. | 395/709 |

OTHER PUBLICATIONS

Rosen et al. Global Value Numbers and Redundant Computations. ACM. pp. 12–27, Jan. 1988.

Gupta. Code Optimization as a Side Effect of Instruction Scheduling. High Performance Computing, 1997. Proceedings. Fourth International Conference. pp. 370–377, Dec. 1997.

Choi et al. Scheduling of Conditional Branches Using SSA From for Superscalar/VLIW Processors. IEEE. pp. 344–351, Jun. 1996.

Park et al. Evolution of Scheduling Techniques on a SPARC–Based VLIW Testbed. IEEE. pp. 104–113, Jan. 1997.

Gupta et al. Path Profile Guided Partial Redundancy Elimination Using Speculation. IEEE. pp. 230–239, Feb. 1998.

Chow et al., "A New Algorithm for Partial Redundancy Elimination based on SSA Form", *Proceedings of the ACM SIGPLAN '97 Conference on Programming Language Design and Implemention*, pp. 273–286, Jun. 1997.

Gupta et al, "Path Profile Guided Dead Code Elimination Using Prediction", *Proceedings of the Fifth International Conference on Parallel Architectures and Compilation Techniques*, pp. 102–113, Nov. 1997.

Gupta et al., "Resource–Sensitive Profile–Directed Data Flow Analysis for Code Optimization", *Proceedings of the 30$^{th}$ Annual International Symposium on Microarchitecture*, pp. 358–368, Dec. 1997.

*Primary Examiner*—Tariq R. Hafiz
*Assistant Examiner*—Wei Zhen
*Attorney, Agent, or Firm*—Sterne, Kessler, Goldstein & Fox P.L.L.C.

[57] ABSTRACT

A method, system, and computer program product for performing speculative code motion within a sparse partial redundancy elimination (PRE) framework. Speculative code motion (i.e., speculation) refers to the placement of computations by a compiler in positions in the program that results in some paths being executed more efficiently and some being executed less efficiently. A net speed-up is thus achieved when the improved paths are those executed more frequently during the program's execution. Two embodiments for performing speculative code motion within the PRE framework are presented: (1) a conservative speculation method used in the absence of profile data; and (2) a profile-driven speculation method used when profile data are available. In a preferred embodiment, the two methods may be performed within static single assignment PRE (SSAPRE) resulting in better optimized code.

13 Claims, 9 Drawing Sheets

FIG. 1A

ORIGINAL CODE

FIG. 1B

CODE AFTER SPECULATION

FIG. 2A

ORIGINAL CODE

FIG. 2B

SPECULATIVE LOAD/STORE INSERTED

FIG. 3

(SSAPRE FLOWCHART)

FIG. 4A

SSA GRAPH FOR h

FIG. 4B x RESULTING PROGRAM

FIG. 10A

ORIGINAL CODE

FIG. 10B x PROMOTED TO REGISTER

METHOD, SYSTEM, AND COMPUTER PROGRAM PRODUCT FOR EXTENDING SPARSE PARTIAL REDUNDANCY ELIMINATION TO SUPPORT SPECULATIVE CODE MOTION WITHIN AN OPTIMIZING COMPILER

CROSS-REFERENCE TO RELATED APPLICATIONS

This application is related to the following commonly-owned, co-pending applications:

"Method, System, and Computer Program Product for Using Static Single Assignment Form as a Program Representation and a Medium for Performing Global Scalar Optimization" by Chow et al, having application Ser. No. 09/097,672 (Attorney Docket No. 15-4-677.00), filed concurrently herewith;

"Method, System, and Computer Program Product for Performing Register Promotion via Load and Store Placement Optimization within an Optimizing Compiler" by Chow et al, having application Ser. No. 09/097,713 (Attorney Docket No. 15-4-658.00), filed concurrently herewith;

"System, Method, and Computer Program Product for Partial Redundancy Elimination Based on Static Single Assignment Form During Compilation" having application Ser. No. 08/873,895, now U.S. Pat. No. 1,026,241, and "System and Method to Efficiently Represent Aliases and Indirect Memory Operations in Static Single Assignment Form During Compilation" having application Ser. No. 08/636,605, now U.S. Pat. No. 5,768,569.

Each of the above applications are incorporated herein by reference in their entirety.

BACKGROUND OF THE INVENTION

1. Field of the Invention

The present invention relates generally to computer program (i.e., software) compilers and more particularly to optimizers in computer program compilers that perform an optimization known as partial redundancy elimination (PRE).

2. Related Art

The Static Single Assignment Form (SSA) is a widely-used program representation in optimizing compilers because it provides accurate use-definition (use-def) relationships among the program variables in a concise form. It is described in detail in R Cytron et al., *Efficiently Computing Static Single Assignment Form and the Control Dependence Graph*, ACM Trans. on Programming Languages and Systems, 13(4):451–490, October 1991, which is incorporated herein by reference in its entirety.

The SSA form, which is well-known in the relevant art(s), can be briefly described as a form where each definition of a variable is given a unique version, and different versions of the same variable can be regarded as different program variables. Each use of a variable version can only refer to a single reaching definition. When several definitions of a variable, $a_1, a_2, \ldots, a_m$, reach a common node (called a merging node) in the control flow graph of the program, a $\phi$ function assignment statement, $a_n = \phi(a_1, a_2, \ldots, a_m)$, is inserted to merge the variables into the definition of a new variable version $a_n$. Thus, the semantics of single reaching definitions are maintained.

Optimizations based on SSA all share the common characteristic that they do not require traditional iterative data flow analysis in their solutions. They take advantage of the sparse representation of SSA. In a sparse form, information associated with an object is represented only at places where it changes, or when the object actually occurs in the program. Because it does not replicate information over the entire program, a sparse representation conserves memory space. Therefore, information can be propagated through the sparse representation in a smaller number of steps, speeding up most algorithms.

Many efficient global optimization algorithms have been developed based on SSA. Among these optimizations are dead store elimination, constant propagation, value numbering, induction variable analysis, live range computation, and global code motion. However, partial redundancy elimination (PRE), a powerful optimization algorithm, was noticeably missing among SSA-based optimizations. PRE was first described in E. Morel and C. Renvoise, *Global Optimization by Suppression of Partial Redundancies*, Comm. ACM, 22(2): 96–103, February 1979, which is incorporated herein by reference in its entirety. PRE, which has since become an important component in many global optimizers, targets partially redundant computations in a program, and removes global common sub-expressions and moves invariant computations out of loops. In other words, by performing data flow analysis on a computation, it determines where in the program to insert the computation. These insertions in turn cause partially redundant computations to become fully redundant, and therefore safe to delete.

Given the fact that PRE was not among SSA-based optimizations, a method for performing SSA-based PRE of expressions, known as SSAPRE, along with a detailed description of SSA and PRE was disclosed and described in detail in a commonly-owned, co-pending application entitled "System, Method, and Computer Program Product for Partial Redundancy Elimination Based on Static Single Assignment Form During Compilation" having application Ser. No. 08/873,895, now U.S. Pat. No. 6,026,241, which is incorporated herein by reference in its entirety.

Furthermore, a method to extend SSAPRE to perform sparse PRE for computations in general (i.e., not just expressions) and to more specifically perform register promotion was disclosed and described in detail in a commonly-owned, co-pending application filed concurrently herewith entitled "Method, System, and Computer Program Product for Performing Register Promotion via Load and Store Placement Optimization within an Optimizing Compiler" having application Ser. No. 09/097,713 (Attorney Docket No. 15-4-658.00), which is incorporated herein by reference in its entirety.

Another optimization done by compilers is speculative code motion (also referred to as speculation). Speculation refers to the placement of computations (e. g., expressions, loads, stores, assignments, etc.) by a compiler in positions in the program that results in some paths being executed more efficiently while some paths execute less efficiently. In order to result in a net speed-up in the overall execution of the program, the improved paths must be executed more frequently than the penalized paths. Thus, speculation is best performed based on the execution profile of the program being compiled. A compiler will generally analyze the profitability of inserting speculative code by focusing on each cross-over point of execution paths and then make individual decisions. This is illustrated in FIGS. 1A and 1B.

Figure 1A:
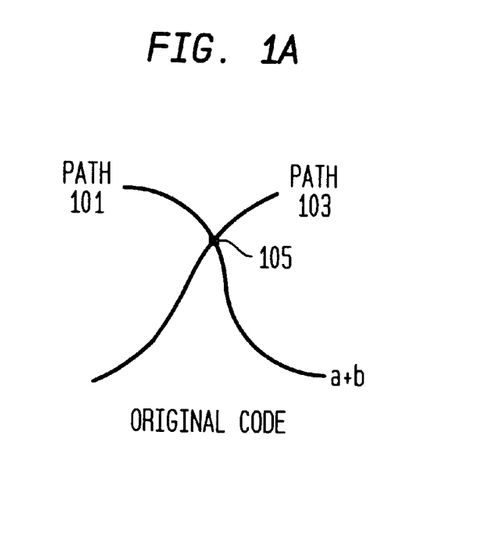
FIGS. 1A and 1B are diagrams illustrating conventional code speculation performed by a compiler.
Figure 1B:
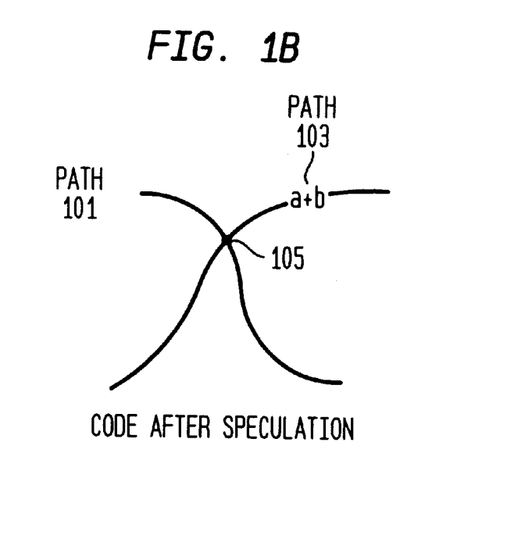

In FIG. 1A, path 101 and path 103 of a computer program intersect at a cross-over point 105. The computation "a+b"

is originally computed during path 101 after the cross-over point 105. If analysis of the software code reveals, however, that path 101 is executed more often than path 103, speculation may move the computation of "a+b" to path 103 before the cross-over point 105 as shown in FIG. 1B. The result of speculation makes path 101 execute more efficiently and path 103 execute less efficiently (i.e., path 103 is "penalized"). Yet, given the proportional execution frequencies between path 101 and path 103, the overall program of FIG. 1B executes more quickly.

Conventional code speculation, as a result, is greatly limited in the speculative code that may be generated. That is, there is no known polynomial time algorithm that may make decisions to simultaneously perform a set of speculation code placement at multiple places while taking into account the execution of all affected blocks. Furthermore no method exists for performing code speculation within PRE. Therefore, what is needed is method, system, and computer program product for extending sparse PRE to support speculative code motion within an optimizing compiler.

SUMMARY OF THE INVENTION

The present invention is directed to a method, system, and computer program product for extending sparse partial redundancy elimination (PRE) to support speculative code motion within an optimizing compiler. The present invention allows the speculation of computations by a compiler to be done within the PRE framework. The method includes accessing a static single assignment (SSA) representation of a computer program and obtaining an SSA graph from the SSA representation. Then, using any of several heuristics, points in the program to enable speculation within each of the plurality of connected components of the SSA graph are determined. At those points, a down_safety flag is set to true for a Φ function. The remaining steps of the sparse PRE will use the down_safety flags to produce optimized code.

In one embodiment, a conservative speculation heuristic is used when no profile data of the program being compiled are available. Thus, the speculation is restricted to moving loop-invariant computations out of single-entry loops. Conservative speculation is SSAPRE extended by calling a "Can-speculate()" function between steps (2) Rename and (3) DownSafety of the previously-disclosed SSAPRE method.

In an alternative embodiment, a profile-driven speculation heuristic is used when profile data of the program being compiled are available. In this instance, the profile data allows the amount of speculation to be controlled. Profile-driven speculation is SSAPRE extended by calling a "Speculating()" function before step (6) CodeMotion of the previously-disclosed SSAPRE method. If "Speculating()" returns true, it will have marked the relevant Φ's as down_safe. Thus, making it necessary to re-apply the WillBeAvail and Finalize steps of SSAPRE.

One advantage of the present invention is that by allowing code speculation to be performed within the PRE framework, the resulting code will exhibit improved performance over code optimized with PRE alone.

Another advantage of the present invention is that different heuristics can be selected to perform speculation. Furthermore, the heuristic employed in the determination step can be conservative speculation, profile-driven speculation, full speculation, no speculation or any solution to the integer programming problem (e.g., brute force, exhaustive search, etc.).

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Table of Contents

I. Overview
II. Overview of SSAPRE
III. Speculative Code Motion
  A. Conservative
  B. Profile-Driven
IV. Benchmark Testing of the Present Invention
V. Environment
VI. Conclusion I. Overview The present invention relates to a method, system, and computer program product for extending sparse partial redundancy elimination to support speculative code motion within an optimizing compiler.

Figure 2A:
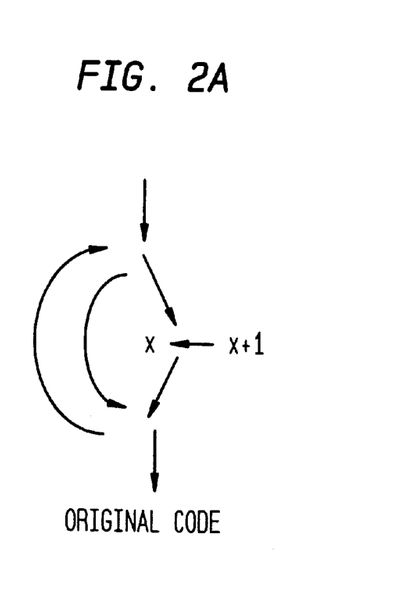
FIGS. 2A and 2B are diagrams illustrating the speculative insertion of a load and store according to an example embodiment of the present invention.
Figure 2B:
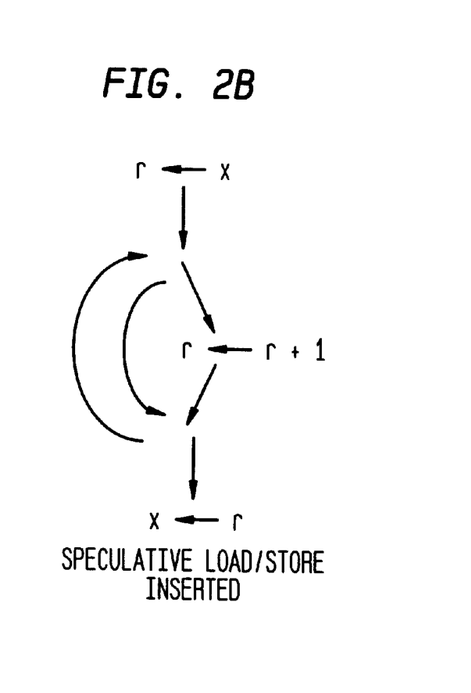
Figure 10A:
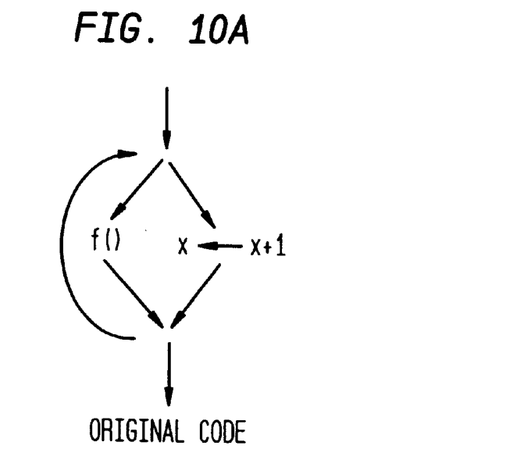
FIGS. 10A and 10B are diagrams illustrating an un-promoted load and store insertion speculative code placement according to an example embodiment of the present invention.
Figure 10B:
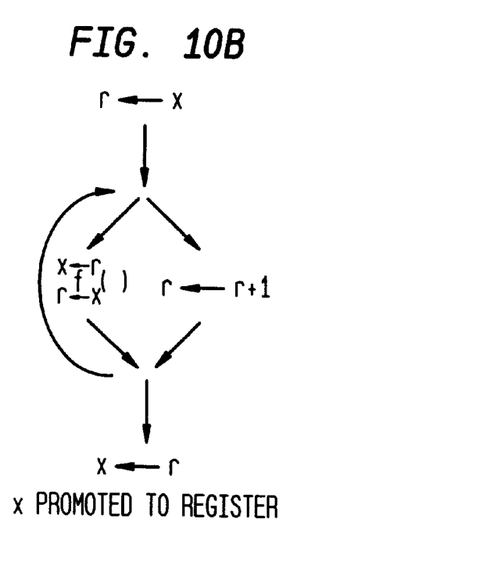

As mentioned above, PRE by its nature does not perform speculative code motion. In some areas such as register promotion, however, it is sometimes beneficial to insert loads and stores speculatively. For example, in FIG. 2A, it is highly desirable to promote variable x to register for the duration of the loop, but the branch in the loop that contains the accesses to x may not be executed, and promoting x to register, as shown in FIG. 2B, is speculative. In this respect, non-PRE-based promotion approaches have an advantage over PRE-based approaches. On the other hand, it is not always good to insert loads and stores speculatively. In the slightly different example of FIG. 10A, the call f() contains aliases to variable x. Promoting x to register requires storing it before the call and reloading it after the call (as shown in FIG. 10B). If the path containing the call is executed more frequently than the path containing the increment to x, promoting x to register will degrade the performance of the loop. The method of the present invention can thus be extended to control speculation in the SSAPRE framework.

The present invention is described in terms of the above example. This is for convenience only and is not intended to limit the application of the present invention. In fact, after reading the following description, it will be apparent to one skilled in the relevant art how to implement the following invention in alternative embodiments (e.g., code speculation not within the context of register promotion—that is, speculation of other computations besides loads and stores).

II. Overview of SSAPRE

As mentioned above, SSAPRE was disclosed and described in detail in the commonly-owned, co-pending application entitled "System, Method, and Computer Program Product for Partial Redundancy Elimination Based on Static Single Assignment Form During Compilation" having application Ser. No. 08/873,895, now U.S. Pat. No. 6,026,241. For completeness, however, SSAPRE can be briefly described as a six-step method that allows partially redundant elimination (PRE) to be done directly on a static single assignment (SSA) representation of a computer program during compilation.

The input to SSAPRE is an SSA representation of the program. In SSA, each definition of a variable is given a unique version, and different versions of the same variable can be regarded as different program variables. Each use of a variable version can only refer to a single reaching definition. By virtue of the versioning, use-def information is built into the representation. Where several definitions of a variable, $a_1, a_2, \ldots, a_m$, reach a confluence point (also called a merging node, or a confluence node) in the control flow graph of the program, a $\phi$ function assignment statement, $a_n \leftarrow \phi(a_1, a_2, \ldots, a_m)$, is inserted to merge them into the definition of a new variable version $a_n$. Thus, the semantics of single reaching definitions are maintained. This introduction of a new variable version as the result of $\phi$ factors the set of use-def edges over confluence nodes, reducing the number of use-def edges required to represent the program. In SSA, the use-def chain for each variable can be provided by making each version point to its single definition. One important property of SSA form is that each definition must dominate all its uses in the control flow graph of the program if the uses at $\phi$ operands are regarded as occurring at the predecessor nodes of their corresponding edges.

Figure 3:
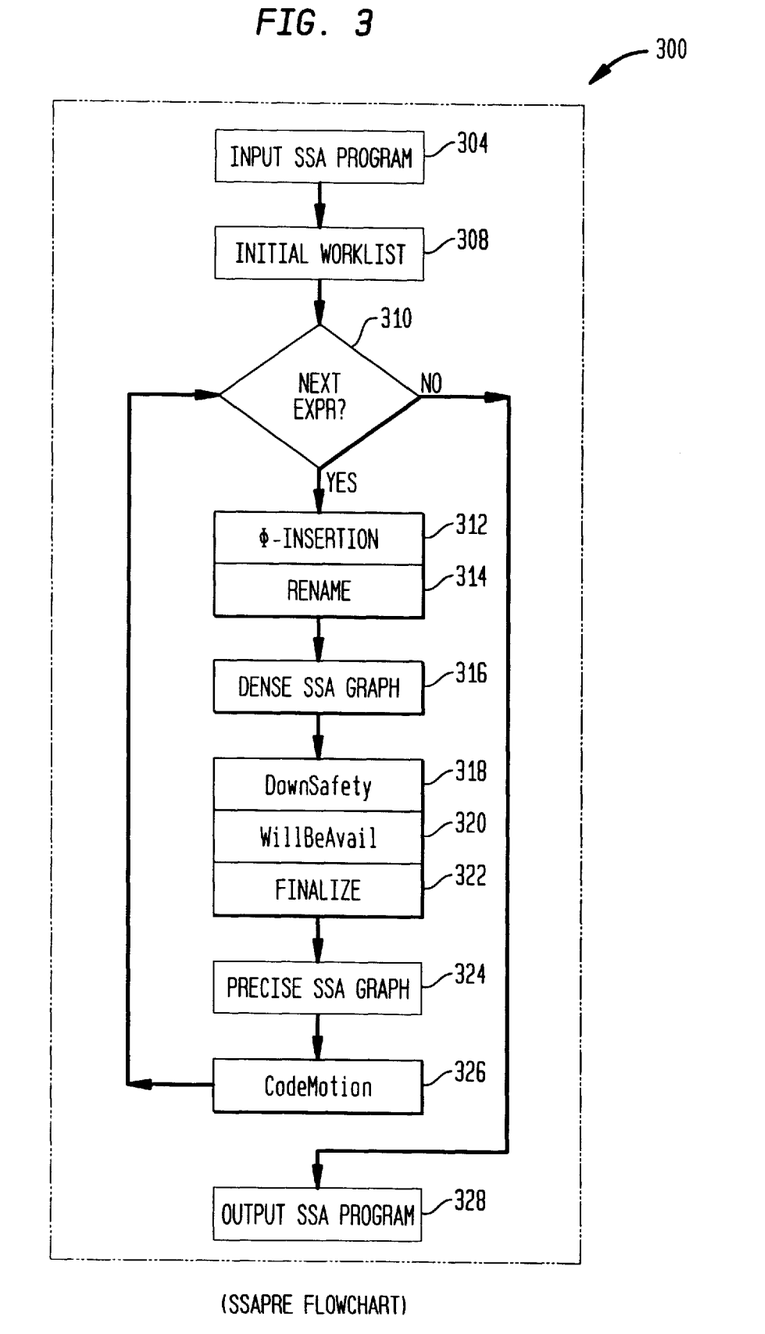
FIG. 3 is a flowchart representing the overall preferred operation of SSAPRE used in accordance with the present invention.

FIG. 3 illustrates a flowchart 300 representing the operation of an optimizing compiler when performing SSAPRE for expressions. The performance of SSAPRE includes six steps: (1) $\Phi$-Insertion (step 312); (2) Rename (step 314); (3) DownSafety (step 318); (4) WillBeAvail (step 320); (5) Finalize (step 322); and (6) CodeMotion (step 326). Steps 312–326 are described further below.

SSAPRE works by conducting a round of SSA construction on the lexically identical expressions in the program whose variables are already in SSA form. Expressions are lexically identical if they apply exactly the same operator to exactly the same operands; the SSA versions of the variables are ignored in matching expressions. For example, $a_1+b_1$ and $a_2+b_2$ are lexically identical expressions.

Since the term SSA cannot generally be meaningfully applied to expressions, SSAPRE defines it to refer to the hypothetical temporary variable h that could be used to store the result of the expression. The symbol $\Phi$ is used herein to refer to an expression or function assignment statement. This is in contrast to the symbol $\phi$, which is used to refer to a variable assignment statement.

The $\Phi$-Insertion step 312 and the Rename step 314 are the initial SSA construction steps for expressions. This round of SSA construction can use an approach that works on all expressions in the program simultaneously. Such an approach is generally described in R. Cytron et al. cited above. Alternatively, an implementation may choose to work on each lexically identical expression in sequence.

The expression a+b, is presented as an example, whose hypothetical temporary is h. After the Rename step 314, occurrences of a+b corresponding to the same version of h must compute to the same value. At this stage, the points of defs and uses of h have not yet been identified. Many $\Phi$'s inserted for h are also unnecessary. Later steps in SSAPRE correct this. Some $\Phi$ operands can be determined to be undefined ($\bot$) after the Rename step 314 because there is no available computation of a+b. These $\bot$-valued $\Phi$ operands play a key role in the later steps of SSAPRE, because insertions are performed only because of them. The SSA graph 316 for h after the Rename step 314 is called a dense SSA graph because it contains more $\Phi$'s than in the minimal SSA form.

The sparse computation of global data flow attributes for a+b can be performed on the dense SSA graph for h. Two separate phases are involved. The first phase, the Down-Safety step 318, performs backward propagation to determine the $\Phi$'s whose results are not fully anticipated with respect to a+b. The second phase is the WillBeAvail step 320, which performs forward propagation to determine the $\Phi$'s where the computation of a+b will be available assuming PRE insertions have been performed at the appropriate incoming edges of the $\Phi$'s.

Using the results of the WillBeAvail step 320, the optimizing compiler is ready to finalize the effects of PRE. The Finalize step 322 inserts computation of a+b at the incoming edges of $\Phi$ to ensure that the computation is available at the merge point. For each occurrence of a+b in the program, it determines if it is a def or use of h. It also links the uses of h to their defs to form its precise SSA graph. Extraneous $\Phi$'s are removed so that h is in minimal SSA form.

The last step is to update the program to effect the code motion for a+b as determined by SSAPRE. The CodeMotion step 326 introduces the real temporary t to eliminate the redundant computations of a+b. It walks over the precise SSA graph of h and generates saves of the computation a+b into t, giving each t its unique SSA version. Redundant computations of a+b are replaced by t. The $\Phi$'s for h are translated into $\phi$'s for t in the native program representation.

III. Speculative Code Motion

In its basic framework, PRE does not allow the insertion of any computation at a point in the program where the computation is not down-safe (i.e., anticipated). This is necessary to ensure the safety of the code placement. Speculation corresponds to inserting computations during SSAPRE at $\Phi$'s where the computation is not down-safe. This effect may be accomplished by selectively marking non-down-safe Φ's as down_safe in the DownSafety step of SSAPRE. In the extreme case, all Φ's may be marked as down_safe in the DownSafety step of SSAPRE. The resulting code motion is thus referred to as full speculation.

In general, a necessary condition for speculative code motion is that the a operation moved must not cause any un-maskable exception. Direct loads can usually be speculated. However, indirect loads from unknown pointer values need to be excluded, unless the targeted hardware can tolerate them. Speculation may or may not be beneficial to program performance, depending on which execution paths are taken more frequently. Thus, it is best to base speculation decisions on the profile data of the program being compiled. In the absence of profile data, there are situations where it is often desirable to speculatively insert loads and stores, as discussed with reference to FIG. 2. Two different speculative code motion embodiments of the present invention, depending on whether profile data are available, are presented below.

A. Conservative Speculation

The conservative speculation embodiment of the present invention may be used when profile data are not available. In this embodiment, speculative code motion is restricted to moving loop-invariant computations out of single-entry loops. As shown in Table 1, procedure SSAPRE_with_Conservative is simply SSAPRE extended by calling "Can_speculate()" between steps (2) Rename and (3) DownSafety of the previously-disclosed SSAPRE method. That is, the "Can_speculate()" function takes as input the dense SSA graph (step 316 of FIG. 3) and after the processing described below, passes the dense SSA graph to the DownSafety step of SSAPRE.

TABLE 1

SSAPRE WITH CONSERVATIVE SPECULATION

```
function Has __⊥_Φ_opnd(X, F)
    if (X is ⊥)
        return true
    if (X not defined by Φ)
        return false
    if (X = F)
        return false
    if (visited(X))
        return false
    visited(X) ← true
    for each operand opnd of X do
        if (Has __⊥_Φ_opnd(opnd, F))
            return true
    return false
end Has __⊥_Φ_opnd
function Can_speculate(F)
    for each Φ X in the loop do
        visited(X) ← false
    for each back-edge operand opnd of F do
        if (Has __⊥_Φ_opnd(opnd, F))
            return false
    return true
end Can_speculate
procedure SSAPRE_with_Conservative
    Φ-Insertion Step
    Rename Step
    Can_speculate Step
    DownSafety Step
    WillBeAvail Step
    Finalize Step
    CodeMotion Step
end SSAPRE_with_Conservative
```

Figure 5:
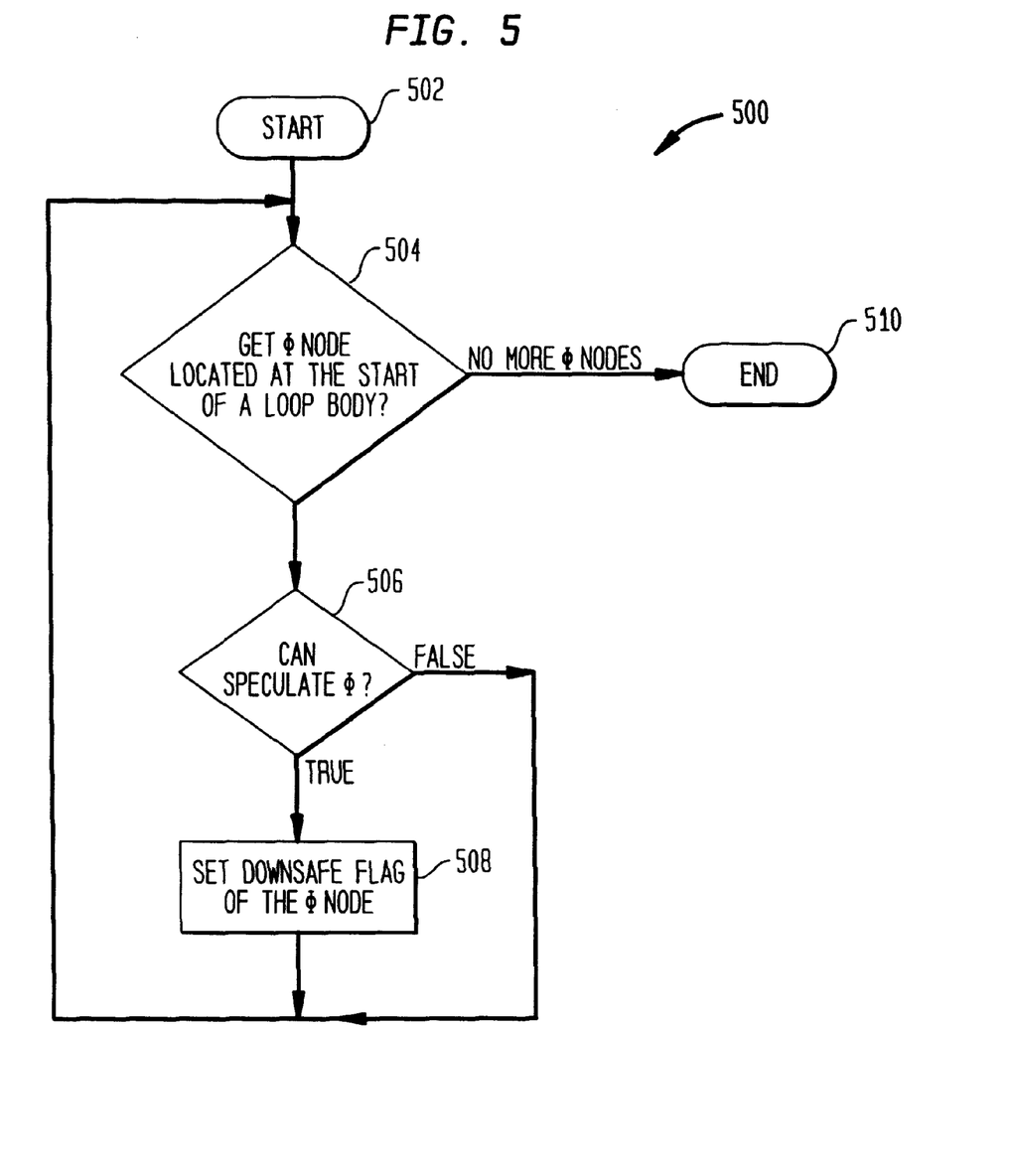
FIG. 5 is a flowchart illustrating conservative speculation according to an example embodiment of the present invention.

Referring to FIG. 5, a flowchart of conservative speculation 500, according to a preferred embodiment of the present invention, is shown. Conservative speculation 500 begins at step 502 with control passing immediately to step 504. In step 504, the analysis for moving loop-invariant computations out of single-entry loops begins by locating the Φ at the start of the loop body is located. In step 506, speculative insertion at the loop header is performed only if no other insertion inside the loop is needed to make the computation fully available at the start of the loop body. The method for this analysis is given by function "Can_speculate()" shown in Table 1 and explained below with reference to FIG. 6. The determination of "Can_speculate()" dictates whether the downsafe flag for the Φ node will be set in step 508. This determination is repeated for every Φ node at the start of a loop until no more nodes are located and conservative speculation 500 ends as indicated by step 510.

Figure 6:
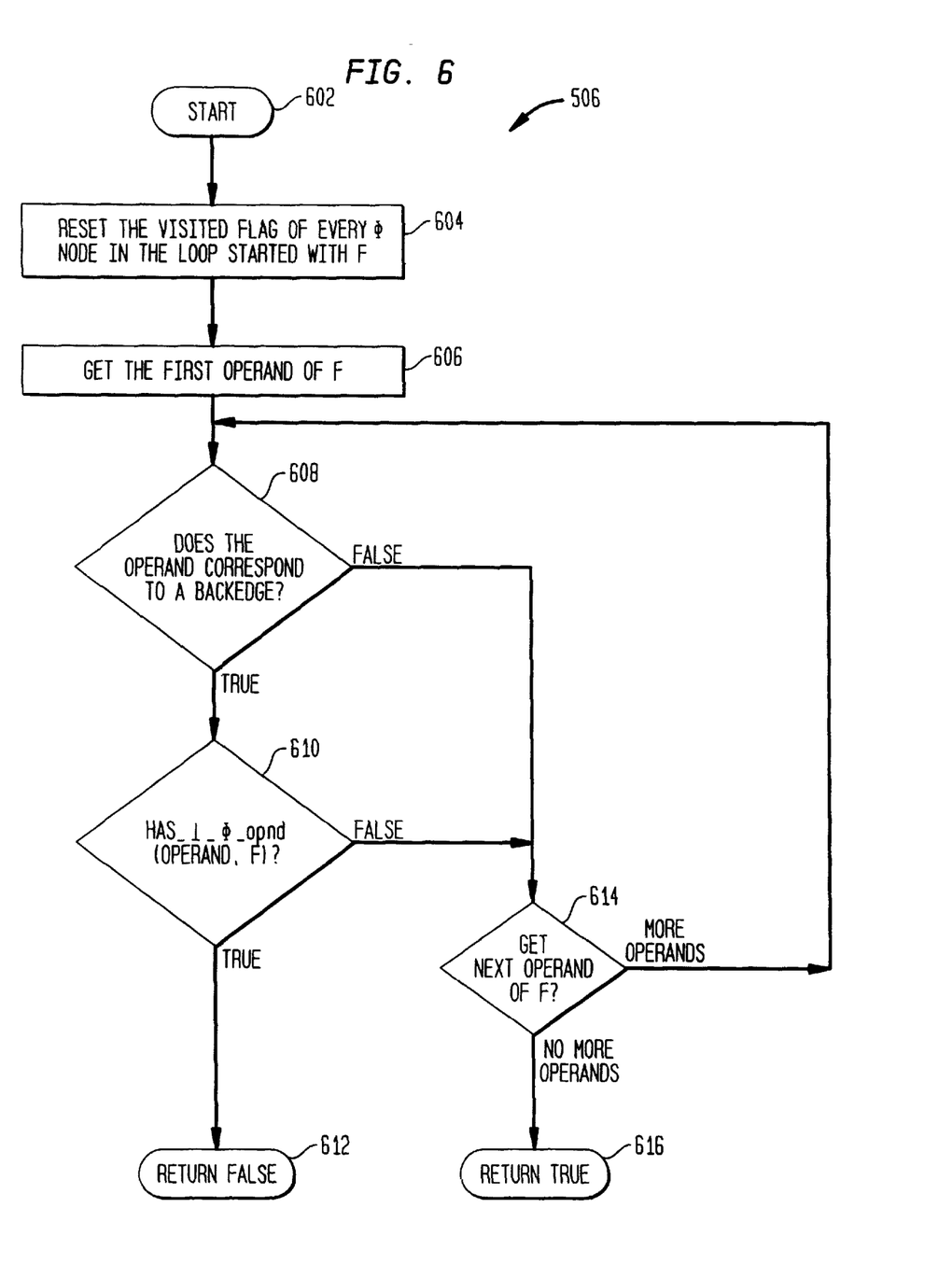
FIG. 6 is a flowchart illustrating a "can speculate ()" conservative speculation routine according to an example embodiment of the present invention.

Referring to FIG. 6, a flowchart illustrating the function "Can-speculate()" (step 506 of FIG. 5) is shown. "Can_speculate()" 506 begins at step 602 with control passing immediately to step 604. In step 604, the visited flag of the Φ node F is reset. In step 606, the first operand of F is retrieved. In step 608, it is determined whether the Φ operand corresponds to the back edges of the loop. If so, the function "Has_⊥_Φ_opnd ()" is called in step 610 passing the operand and node as parameters.

The "Has_⊥_Φ_opnd ()" function will indicate that the computation is available at that back edge without requiring any insertion other than the one at the operand of F that corresponds to the loop entry. Because ⊥ represents potential insertion points, "Has_⊥_Φ_opnd ()" returning false will indicate that the computation is available at that back edge without requiring any insertion other than the one at the operand of F that corresponds to the loop entry. Thus, "Has_⊥_Φ_opnd ()" returning true will cause "Can_speculate()" 506 to return a false and F will not be marked as down_safe in step 508 (as also indicated in step 612). Consequently, "Has_⊥_Φ_opnd ()" returning false will cause "Can_speculate()" 506 to return a true and F will be marked as down_safe in step 508. In steps 606, 608 and 610, a no or false result, respectively, will simply retrieve the next operand of F (step 614) and repeat these steps until no more operands are left as indicated by step 616.

Figure 7:
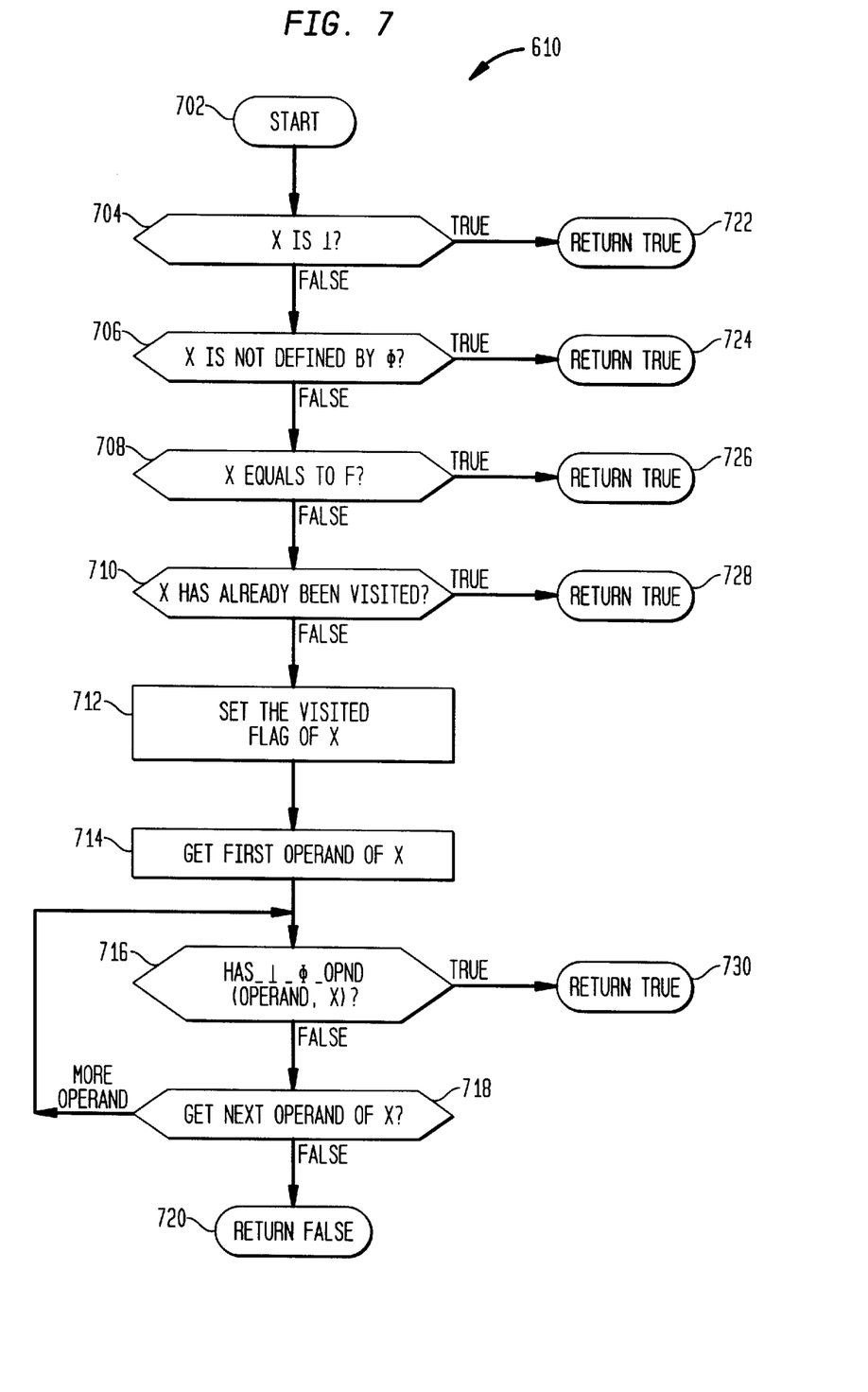
FIG. 7 is a flowchart illustrating a "Has __⊥__Φ__opnd()" conservative speculation routine according to an example embodiment of the present invention.

Referring to FIG. 7, a flowchart illustrating the function "Has_⊥_Φ_opnd ()" (step 610 of FIG. 7) is shown (see also Table 1). The "Has_⊥_Φ_opnd ()" function 610 begins at step 702 with control passing immediately to step 704. In step 704, the determination is made to see if X is undefined (⊥) after the Rename step 314. X is simply the operand passed into "Has_⊥_Φ_opnd ()" in step 610 of the "Can_speculate()" function 506. If so, "Has_⊥_Φ_opnd ()" returns a true to the "Can_speculate()" function 506. If not, step 706 determines if x is defined by a Φ.

If x is defined by a Φ, "Has_⊥_Φ_opnd ()" 612 returns a false to the "Can_speculate()" function 506. If not, step 708 determines if X is equal to F. If X is equal to F, "Has_⊥_Φ_opnd ()" 612 returns a true to the "Can_speculate ()" function 506. If not, step 710 determines if x has already been visited. If x has already been visited, "Has_⊥_Φ_opnd ()" 612 returns a false to the "Can_speculate()" function 506. If not, step 712 set the visited flag of X and then recursively calls "Has_⊥_Φ_opnd ()" 612 on each operand of X (step 714). Steps 716–730 behave as described above with reference to steps 610–616 of FIG. 6.

Figure 4A:
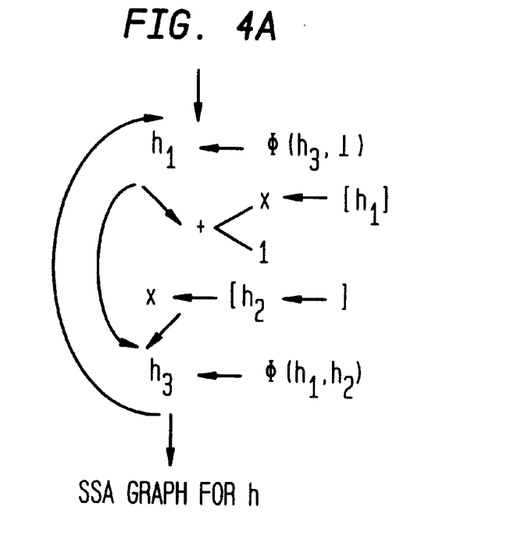
FIGS. 4A and 4B are diagrams illustrating a speculative code placement according to an example embodiment of the present invention.
Figure 4B:
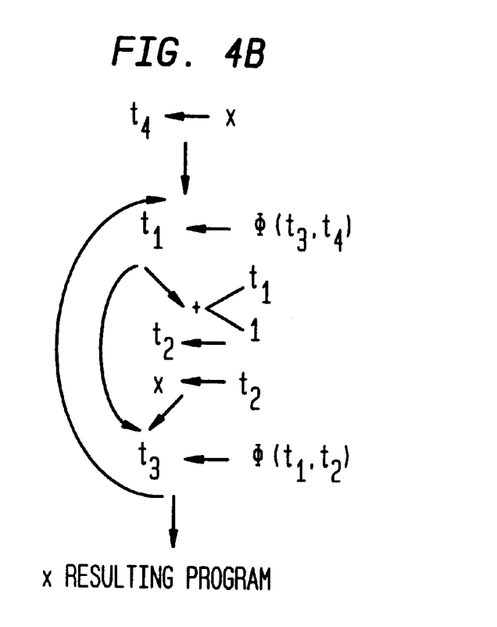

FIGS. 4A and 4B shows the results of applying conservative speculation 500 to the program of FIG. 2A. The method marks the Φ corresponding to h1 in FIG. 4A as down_safe. FIG. 4B shows the program after the load has been speculatively moved out of the loop. Subsequent application of speculative code motion in the PRE of stores will move the store out of the loop to yield the result shown in FIG. 2B.

B. Profile-driven Speculation

Without knowledge of execution frequency, any speculation can potentially hurt performance. But when execution profile data are provided, it is possible to tailor the use of speculation to maximize run-time performance for executions of the program that match the given profile. Profile data, as is well-known in the relevant art(s), refer to data obtained from a representative run of the computer program code being compiled. The data typically include a report on the amounts of time spent in different parts of each routine within a program. Such data may be used to locate and "tune" the CPU-intensive portions of code. It is not unlikely that in most programs, less than 10% of the code utilizes 90% of the execution time. Those identified portions of code are strong candidates for optimization (and thus, speculation).

The optimum code placement, according to the present invention, lies somewhere between no speculation and fall speculation. Code placement with no speculation corresponds to the results obtained by traditional PRE. Code placement with full speculation corresponds to the results of SSAPRE, as indicated above, if all Φ's are marked down_safe in the DownSafety step. The problem of determining an optimum placement of loads and stores can be expressed as an instance of the integer programming problem, for which no practical algorithm for solving is known.

In one example, instead of aiming for the optimal solution, the present invention obtains a practical, versatile and easy-to-implement solution that never performs worse than no speculation, and which is subject to accuracy of the profile data. It will be apparent to one skilled in the art, after reading the following description, that alternative heuristics for marking the Φ's down_safe in the DownSafety step of SSAPRE may be employed. That is, solutions to the integer programming problem such as brute force, exhaustive search, etc. (although not practical) may be employed in marking the Φ's down_safe for speculation. The term "heuristic" is used herein in its general sense, meaning a rule of thumb, simplification or educated guess that reduces or limits the search for a solution in a domain that is difficult and poorly understood. Heuristics, generally, do not guarantee an optimal (or often even a feasible) solution.

In the preferred embodiment of the present invention, the granularity for deciding whether to speculate is each connected component of the SSA graph formed by SSAPRE. For each connected component, full speculation or no speculation is performed. Though this limits the possible placements that may be considered, it enables the complexity of finding and evaluating the remaining placement possibilities to be avoided. When the connected components are small, which is typically the case, better results are usually obtained. This is because fewer placement possibilities are missed.

The present invention's profile-driven speculative code motion works by comparing the performance with and without speculation using the basic block frequency data provided by the execution profile. The overall technique is an extension of the SSAPRE algorithm. Example, pseudo-code implementing SSAPRE with profile-driven speculation is given in Table 2.

TABLE 2

SSAPRE WITH PROFILE-DRIVEN SPECULATION

```
procedure Compute_speculation_savings
    for each connected component C in SSA graph
        savings [C] ← 0
    for each real occurrence R in SSA graph
        if (Reload(R) = false and R is defined by a Φ F)
            savings[Connected_component(F)] += freq(R)
    for each Φ occurrence F in SSA graph
        for each operand opnd of F
            if (Insert(opnd) = true) {
                if (opnd is defined by a Φ)
                    savings[Connected_component(F)] += freq(R)
            }
            else if (opnd is ⊥)
                savings[Connected_component(F)] -= freq(opnd)
end Compute_speculation_savings
function Speculating( )
    has_speculation ← false
    remove Φ's that are not partially available or
        partially anticipated
    identify connected components in SSA graph
    Compute_speculation_savings( )
    for each connected component C in SSA graph
        if (savings[C] > 0) {
            mark all Φ's in C down_safe
            has_speculation ← true
        }
        return has_speculation
end Speculating
procedure SSAPRE_with_profile
    Φ-Insertion Step
    Rename Step
    DownSafety Step
    WillBeAvail Step
    Finalize Step
    if (Speculating( )) {
        WillBeAvail Step
        Finalize Step
    }
    CodeMotion Step
end SSAPRE_with_profile
```

The "SSAPRE_with_profile" procedure gives the overall phase structure for the profile-driven SSAPRE. Regular SSAPRE is first performed with no speculation. Before the CodeMotion step, when SSAPRE has obtained a precise SSA graph (step 324 of FIG. 3), a call to the "Speculating()" function is made. The function determines whether there is any connected component in the computation being processed that warrants full speculation. If "Speculating()" returns true, it will have marked the relevant Φ's as down_safe. Thus, it is necessary to re-apply the WillBeAvail and Finalize steps, which yield the new code placement result with speculation. The last step, CodeMotion, works the same way regardless of whether speculation is performed or not.

Figure 8:
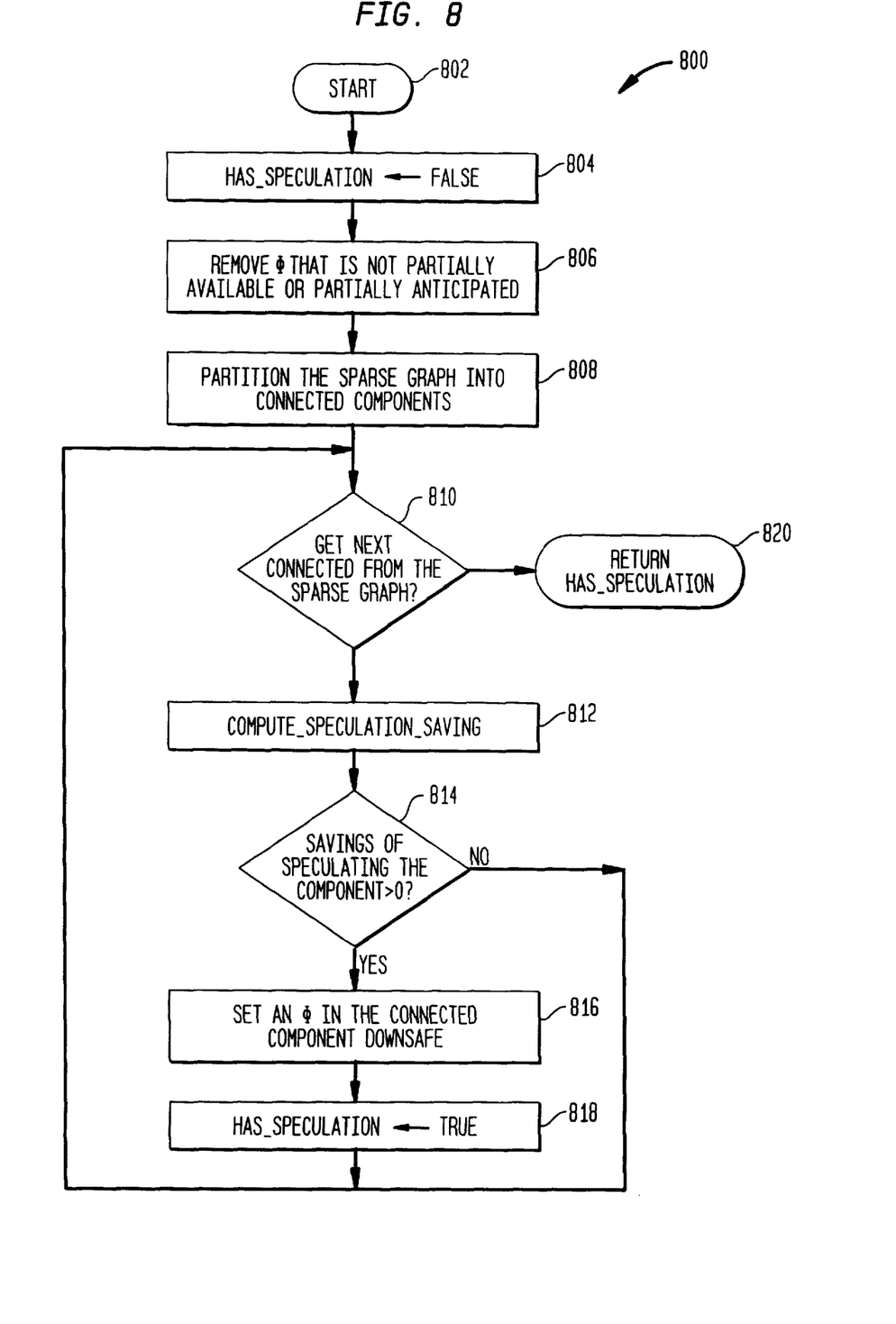
FIG. 8 is a flowchart illustrating profile-driven speculation according to an example embodiment of the present invention.

Referring to FIG. 8, the "Speculating()" function 800 according to an embodiment of the present invention is shown. The "Speculating()" function 800 is responsible for determining if fall speculation should be applied to each connected component in the SSA graph. The "Speculating()" function 800 begins at step 802 with control passing immediately to step 804. In step 804, the Has_speculation flag is set to false. In step 806, the SSA graph is pruned by removing Φ where the computation is not partially available or not partially anticipated. Φ's where the computation is not partially available are never best insertion points because some later insertion points yield the same redundancy and are better from the point of view of the temporary's live range. Insertions made at Φ's where the computation is not partially anticipated are always useless because they do not make possible any deletion.

In step 808, after removing these Φ's and deleting all references to them, "Speculating()" function 800 partitions the SSA graph into its connected components. In step 812, the "Compute_speculation_savings" procedure determines whether speculation can reduce the dynamic counts of the computation on a per-connected-component basis (step 810), using the results of SSAPRE with no speculation as the baseline.

After the "Compute_speculation_savings" procedure 812 returns, "Speculating()" function 800 iterates through the list of connected components. If the tallied result in savings is positive for a connected component (step 814), it means speculative insertion is profitable, and "Speculating ()" will effect full speculation by marking all Φ's in the connected component as down_safe (step 816). In step 818, the Has_speculation flag is set to true so that "Speculating ()" function 800 returns true. As mentioned above, this indicates to SSAPRE_with_profile that it is necessary to re-apply the WillBeAvail and Finalize steps, which yield the new code placement result with speculation.

In an alternate embodiment, steps 3 to 5 of SSAPRE (DownSafety, WillBeAvail and Finalize can be bypassed and the insertion and deletion points directly updated. It is not done, however, because it is preferable to retain the flexibility of arbitrarily partitioning a connected component. For example, it is preferable to disregard edges with zero frequency, without sacrificing the property that the optimized result is free of redundancy removable by safe code motion.

Figure 9:
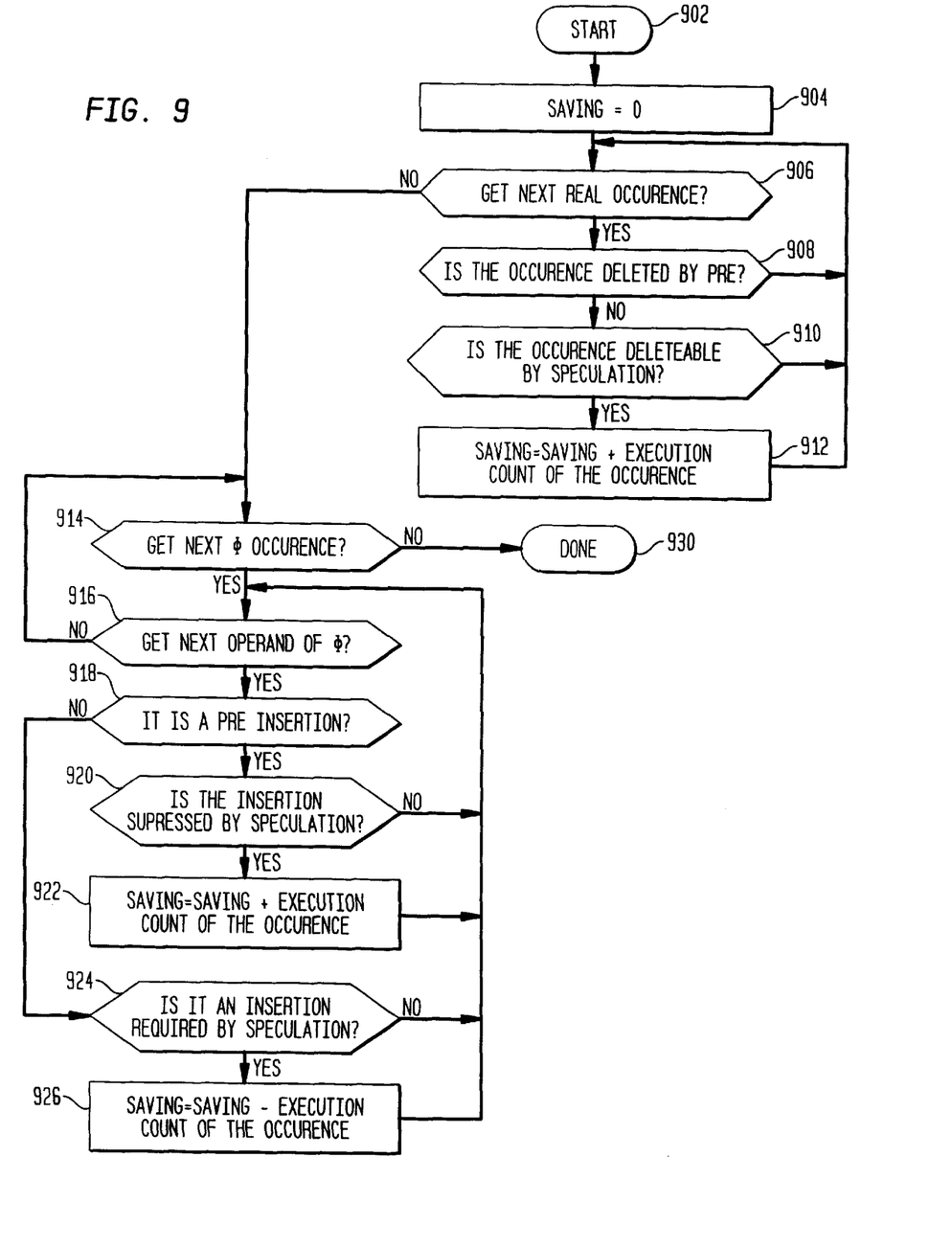
FIG. 9 is a flowchart illustrating a "compute_ speculation_saving()" profile-driven speculation routine according to an example embodiment of the present invention.

Table 2 also presents example pseudo-code for the "Compute_speculation_savings" procedure 812. Given a connected component of an SSA graph where the computation is partially available throughout, it is straightforward to predict the code placement that corresponds to full speculation. Since all Φ's in the component are regarded as down-safe, the WillBeAvail step will find that can_be_avail holds for all of them. The purpose of the computation of Later in the WillBeAvail step is only for live range optimality, and does not affect computational optimality. If the Later property is ignored, the Finalize step will decide to insert at all the ⊥ operands of the Φ's. In addition, the insertions will render fully redundant any real occurrence within the connected component whose h-version is defined by Φ.

By predicting the code placement for full speculation, Compute_speculation_savings procedure 812 can compute the benefits of performing full speculation for individual connected components and store them in the savings[C] array, indexed by the connected components. The savings is the sum of the dynamic counts of the real occurrences deleted and any non-speculative SSAPRE insertions suppressed due to full speculation, minus the dynamic counts for the new insertions made by full speculation.

Referring to FIG. 9, a flowchart of "Compute_speculation_savings" procedure 812 for one connected component according to a preferred embodiment of the present invention is shown. Compute_speculation_savings procedure 812 begins at step 902 with control passing immediately to step 904. Compute_speculation_savings procedure 812 iterates through all real and Φ occurrences in the SSA graph. Whenever it encounters a non-deleted real occurrence that is defined by a Φ, it increases savings for the connected component by the execution frequency of the real occurrence (steps 906–912). Deletions made by SSAPRE are passed over (step 908) because those deletions would have been done with or without the speculation part. Other real occurrences are not affected by full speculation.

For each Φ occurrence, "Compute_speculation_savings" procedure 812 iterates through its operands (steps 914–926). If the Φ operand is marked insert (step 918) and is defined by another Φ (step 920), the algorithm also increases savings for the connected component by the execution frequency of the Φ operand (step 922) because full speculation will hoist such insertions to earlier Φ's. If the Φ operand is ⊥ (step 924), the algorithm decreases savings for the connected component by the execution frequency for the Φ operand (step 926) because under full speculation, insertions will be performed at these Φ operands.

With the present invention's profile-driven speculation method, speculation is performed only in those connected components where it is beneficial. In contrast to the technique described in Gupta et al., *Path Profile Guided Partial Dead Code Elimination Using predication*, Proceedings of the Fifth International Conference on Parallel Architectures and Compilation Techniques, pp. 102–112, November 1997, the decisions of the present invention are made globally based on a per-connected-component basis in the SSA graph. In the example of FIGS. 10A and 10B, the present invention will promote x to a register if the execution count of the path containing the call is lower than that of the path containing the store. In the absence of profile data, the conservative speculation embodiment of the present invention will not trigger the speculative code motion in this example because it requires insertion in the body of the loop.

IV. Benchmark Testing of the Present Invention

Benchmark testing of the speculative code motion techniques of the present invention, implemented in a commercial compiler such as the MIPSpro™ compiler (Release 7.2) available from Silicon Graphics, Inc. of Mountain View, Calif., was performed. More particularly, compiling the SPECint95 benchmark suite and measuring the resulting dynamic load and store counts when the benchmarks are executed using the training input data was done to evaluate the present invention.

The SPECint 95 benchmark, which is well-known in the relevant art(s), is developed by the non-profit Standard Performance Evaluation Corporation (SPEC) of Manassas, Va. and derives from the results of a set of integer benchmarks (i.e., the geometric mean of the execution times of eight standard programs).

The benchmarks were compiled at an −O2 optimization level with no in-lining. Only intra-procedural alias analysis was applied. The measurement data are gathered by simulating the compiled program after register promotion, but before code generation and register allocation. In the simulation, each access to a pseudo-register is not counted as load or store. This is equivalent to assuming that the underlying machine has an infinite number of registers; the assumption allows us to measure the effects of register promotion without confounding effects such as spilling performed by the register allocator.

Although speculative code motion is applicable to any computation, as mentioned above, loads and stores are presented herein by way of example. The target architecture of the preferred embodiment of the present invention is the MIPS™ R10000 microprocessor available from MIPS Technologies, Inc. (a subsidiary of Silicon Graphics, Inc.) of Mountain View, Calif., which is well-known in the relevant art(s). In the MIPS R10000, indirect loads and indirect stores cannot be speculated. Thus, only data for scalar loads and stores was focused upon.

The effects of different speculative code motion strategies on the executed scalar load and store counts respectively in the SPECint95 benchmarks can be studied. The baseline for measuring effectiveness of the present invention is data which shows the scalar load and store counts without register promotion. This (1) baseline data can then be compared to: (2) data when PRE of loads and stores are applied without speculation; (3) data results from applying conservative speculative code motion; and (4) data results from applying profile-driven speculative code motion.

Experimentation results show that full speculation yields the worst performance of the three different speculative code motion strategies. This supports the contention that it is worth the effort to avoid overdoing speculation. Full speculation yields improvement over no speculation only with respect to two of the eight standard programs (load in 126.gcc and stores in 134.perl). When profile data are unavailable, conservative speculation yields mixed results compared with no speculation with no effect on a number of the benchmarks. Where there is a change, the effect is biased towards the negative side. The conservative speculative code motion strategy of the present invention can increase the executed operation count if some operations inserted in loop headers would not have been executed in the absence of speculation. In the case of the SPECint95 benchmark suite, this situation seems to arise more often than not.

When profile data are available, the profile-driven speculative code motion strategy of the present invention consistently yields the best results. The data shows that the profile-driven speculation strategy is successful in making use of execution frequency information in avoiding over-speculation by speculating only in cases where it is certain improvement will occur. In programs with complicated control flow like 126.gcc, the profile-driven speculation of the present invention yields greater improvements. Since in-lining augments control flow, even better results can be expected if the benchmarks are compiled with in-lining. Overall, profile-driven speculation contributes to 2% further reduction in dynamic load counts and 0.5% further reduction in dynamic store counts. When profile-driven speculation is applied to other types of operations that can be speculated, a similar reduction in dynamic counts can be expected for those operations. Given the current trend toward hardware support for more types of instructions that can be speculated, the profile-driven speculation of the present invention can be expected to play a greater role in improving program performance for newer generations of processors.

The above description of the benchmark testing in simulations of the code motion strategies of the present invention are illustrative only and not intended to limit the present invention.

V. Environment

Figure 11:
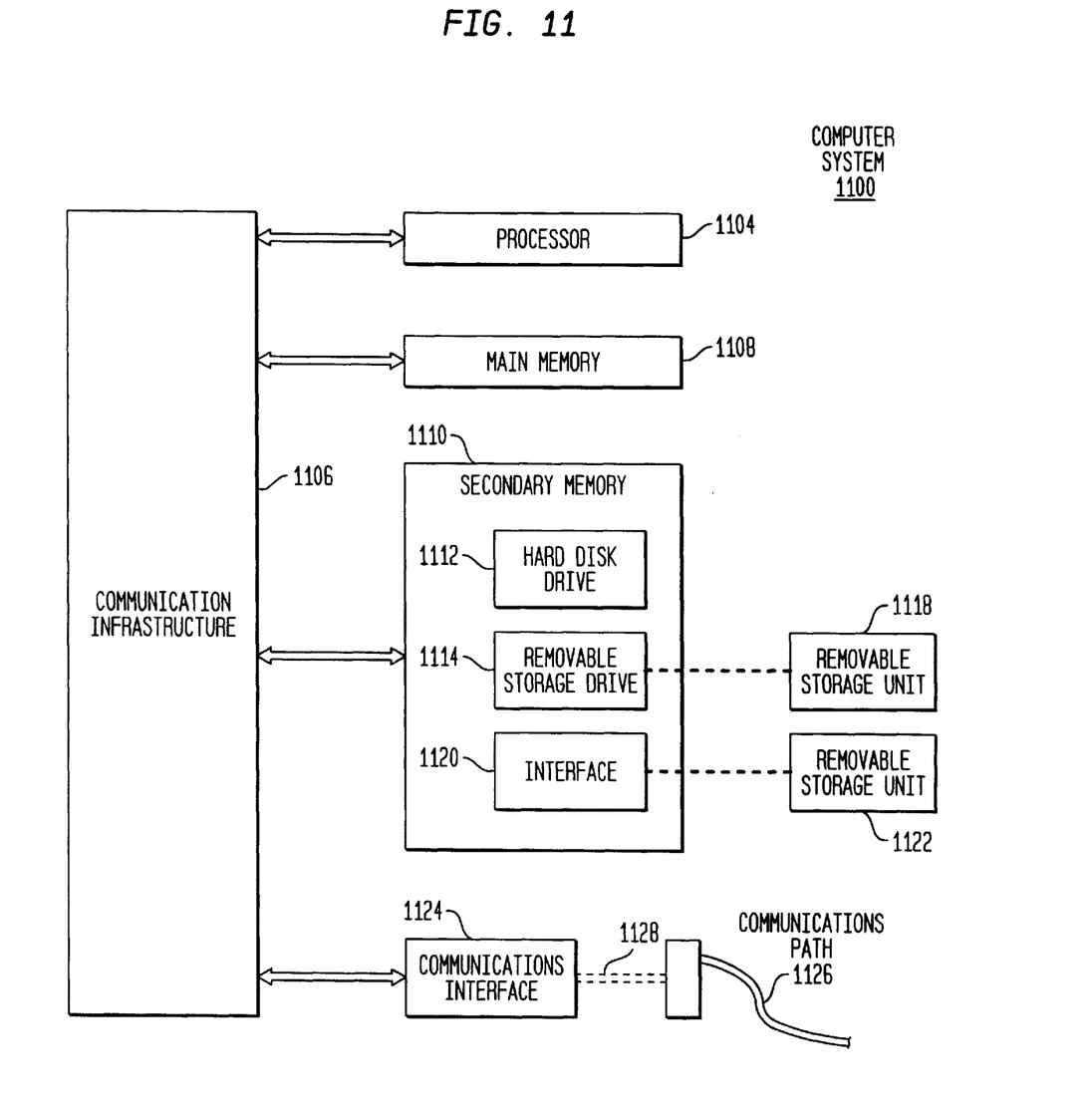
FIG. 11 is a block diagram of an example computer system for implementing the present invention.

In general, the present invention may be implemented in any compiler running on any machine, including but not limited to the MIPSpro compiler running on an machine with a MIPS R10000 microprocessor. The present invention may be implemented using hardware, software or a combination thereof and may be implemented in a computer system or other processing system. In fact, in one embodiment, the invention is directed toward one or more computer systems capable of carrying out the functionality described herein. An example of a computer system 1100 is shown in FIG. 11. The computer system 1100 represents any single or multi-processor computer. The computer system 1100 includes one or more processors, such as processor 1104. The processor 1104 is connected to a communication infrastructure 1106 (e.g., a communications bus or network). Various software embodiments are described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels.

In this document, the terms "computer program medium" and "computer usable medium" are used to generally refer to media such as removable storage drive 1114, a hard disk installed in hard disk drive 1112, and signals 1128. These computer program products (e.g., memory, media, disks, etc.) are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

VI. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method to perform speculative code motion within a single static form partial redundancy elimination (SSAPRE) optimization, within a compiler, comprising the steps of:

(1) accessing a static single assignment (SSA) representation of a computer program;

(2) obtaining an SSA graph of the hypothetical variable from said SSA representation of said computer program, wherein said SSA graph comprises a plurality of connected components;

(3) using a heuristic to determine a plurality of points to enable speculation within each of said plurality of connected components of said SSA graph; and (4) performing the SSAPRE optimization whereby setting a down_safety flag to true for a $\Phi$ function of each of said determined plurality of points within each of said plurality of connected components of said SSA graph;

whereby the compiler can produce more efficient executable program code from said SSA graph by speculating at each of said determined plurality of points where said down_safety flag is true.

2. The method of claim 1, wherein said heuristic can be at least one of the following:

(i) Conservative speculation;

(ii) Profile-driven speculation;

(iii) Full speculation; and (iv) No speculation.

3. The method of claim 2, wherein a different heuristic is employed within each of said plurality of connected components of said SSA graph to determine a plurality of points to enable speculation.

4. The method of claim 1, wherein said heuristic is profile-driven speculation and further comprising the step of accessing a collection of profile data for said computer program.

5. A method to perform conservative speculative code motion within a static single assignment partial redundancy elimination (SSAPRE) register promotion compiler optimization, the SSAPRE optimization including six steps: (1) $\Phi$-Insertion, (2) Rename, (3) DownSafety, (4) WillBeAvail, (5) Finalize, and (6) CodeMotion, the method comprising the steps of:

(1) accessing a static single assignment (SSA) representation of a computer program;

(2) performing steps (1) and (2) of the SSAPRE optimization on said SSA representation, thereby obtaining a dense SSA graph of said computer program;

(3) performing a can speculate function on said dense SSA graph, thereby marking at least one $\Phi$ function of said dense SSA graph as being downsafe; and (4) performing steps (3), (4), (5) and (6) of the SSAPRE optimization on said dense SSA graph;

whereby the compiler can produce more efficient, speculated executable program code from said dense SSA graph.

6. A method to perform profile-driven speculative code motion within a static single assignment partial redundancy elimination (SSAPRE) register promotion compiler optimization, the SSAPRE optimization including six steps: (1) $\Phi$-Insertion, (2) Rename, (3) DownSafety, (4) WillBeAvail, (5) Finalize, and (6) CodeMotion, the method comprising the steps of:

(1) accessing a static single assignment (SSA) representation of a computer program;

(2) accessing a collection of profile data for said computer program;

(3) performing steps (1), (2) (3), (4) and (5) of the SSAPRE optimization on said SSA representation, thereby resulting in a precise SSA graph;

(4) performing a speculating function, using said collection of profile data, on said precise SSA graph thereby determining whether at least one $\Phi$ function of said precise SSA graph should be marked as being downsafe;

(5) performing steps (4) and (5) of the SSAPRE optimization on said precise SSA graph if step (4) determines that at least one $\Phi$ function of said precise SSA graph should be marked as being downsafe; and (6) performing step (6) of the SSAPRE optimization on said precise SSA graph;

whereby the compiler can produce more efficient, speculated executable program code from said precise SSA graph.

7. A compiler that performs speculative code motion within a single static form partial redundancy elimination (SSAPRE) optimization, comprising:

means for accessing a static single assignment (SSA) representation of a computer program;

means for obtaining an SSA graph of the hypothetical variable from said SSA representation of said computer program, wherein said SSA graph comprises a plurality of connected components;

means for using a heuristic to determine a plurality of points to enable speculation within each of said plurality of connected components of said SSA graph; and means for performing the SSAPRE optimization whereby setting a down_safety flag to true for a $\Phi$ function of each of said determined plurality of points within each of said plurality of connected components of said SSA graph;

whereby the compiler can produce more efficient executable program code from said SSA graph by speculating at each of said determined plurality of points where said down safety flag is true.

8. The compiler of claim 7, wherein said heuristic can be at least one of the following:

(i) Conservative speculation;

(ii) Profile-driven speculation;

(iii) Full speculation; and (iv) No speculation.

9. The compiler of claim 8, wherein a different heuristic is employed within each of said plurality of connected components of said SSA graph to determine a plurality of points to enable speculation.

10. The compiler of claim 7, wherein said heuristic is profile-driven speculation and further comprising means for accessing a collection of profile data for said computer program.

11. A computer program product comprising a computer usable medium having computer readable program code means embodied in said medium for causing an application program to execute on a computer that performs speculative code motion within a single static form partial redundancy elimination (SSAPRE) optimization, within an compiler, said computer readable program code means comprising:

a first computer readable program code means for causing the computer to access a static single assignment (SSA) representation of a computer program;

a second computer readable program code means for causing the computer to obtain an SSA graph of the hypothetical variable from said SSA representation of said computer program, wherein said SSA graph comprises a plurality of connected components;

a third computer readable program code means for causing the computer to use a heuristic to determine a plurality of points to enable speculation within each of said plurality of connected components of said SSA graph; and a fourth computer readable program code means for causing the computer to perform the SSAPRE optimization whereby setting a down_safety flag to true for a $\Phi$ function of each of said determined plurality of points within each of said plurality of connected components of said SSA graph;

whereby the compiler can produce more efficient executable program code from said SSA graph by speculating at each of said determined plurality of points where said down safety flag is true.

12. A computer program product comprising a computer usable medium having computer readable program code means embodied in said medium for causing an application program to execute on a computer that performs conservative speculative code motion within a static single assignment partial redundancy elimination (SSAPRE) register promotion compiler optimization, the SSAPRE optimization including six steps: (1) $\Phi$-Insertion (2) Rename, (3) DownSafety, (4) WillBeAvail, (5) Finalize, and (6) CodeMotion, said computer readable program code means comprising:

a first computer readable program code means for causing the computer to access a static single assignment (SSA) representation of a computer program;

a second computer readable program code means for causing the computer to perform steps (1) and (2) of the SSAPRE optimization on said SSA representation, thereby obtaining a dense SSA graph of said computer program;

a third computer readable program code means for causing the computer to perform a can_speculate function on said dense SSA graph, thereby marking at least one $\Phi$ function of said dense SSA graph as being downsafe; and a fourth computer readable program code means for causing the computer to perform steps (3), (4), (5) and (6) of the SSAPRE optimization on said dense SSA graph;

whereby the compiler can produce more efficient, speculated executable program code from said dense SSA graph.

13. A computer program product comprising a computer usable medium having computer readable program code means embodied in said medium for causing an application program to execute on a computer that performs profile-driven speculative code motion within a static single assignment partial redundancy elimination (SSAPRE) register promotion compiler optimization, the SSAPRE optimization including six steps: (1) $\Phi$-Insertion, (2) Rename, (3) DownSafety, (4) WillBeAvail, (5) Finalize, and (6) CodeMotion, said computer readable program code means comprising:

a first computer readable program code means for causing the computer to access a static single assignment (SSA) representation of a computer program;

a second computer readable program code means for causing the computer to access a collection of profile data for said computer program;

a third computer readable program code means for causing the computer to perform steps (1), (2) (3), (4) and (5) of the SSAPRE optimization on said SSA representation, thereby resulting in a precise SSA graph;

a fourth computer readable program code means for causing the computer to perform a speculating function, using said collection of profile data, on said precise SSA graph thereby determining whether at least one $\Phi$ function of said precise SSA graph should be marked as being downsafe;

a fifth computer readable program code means for causing the computer to perform steps (4) and (5) of the SSAPRE optimization on said precise SSA graph if step (4) determines that at least one $\Phi$ function of said precise SSA graph should be marked as being downsafe; and a sixth computer readable program code means for causing the computer to perform step (6) of the SSAPRE optimization on said precise SSA graph;

whereby the compiler can produce more efficient, speculated executable program code from said precise SSA graph.

* * * * *